United States Patent

McConnell et al.

[11] 3,983,769
[45] Oct. 5, 1976

[54] METHOD AND APPARATUS FOR PRODUCING COMPOUND CURVES CORRESPONDING TO THE INTERSECTION BETWEEN TWO CYLINDERS

[75] Inventors: Roy E. McConnell, Seattle; Lee R. Hays; Hans H. Herrmann, both of Edmonds, all of Wash.

[73] Assignee: Earle M. Jorgensen Company, Seattle, Wash.

[22] Filed: Sept. 22, 1975

[21] Appl. No.: 615,610

[52] U.S. Cl. .................................. 82/1 C; 82/2 D; 82/14 R; 82/19
[51] Int. Cl.² .................. B23B 3/00; B23B 3/28
[58] Field of Search ............. 82/1, 2 R, 2 A, 2 D, 82/14, 18, 19, 46, 47, 14

[56] References Cited
UNITED STATES PATENTS

| | | |
|---|---|---|
| 1,492,103 | 4/1924 | Parkes .............................. 82/2 D |
| 2,329,246 | 9/1943 | Bullard et al. ...................... 82/19 |
| 2,777,349 | 1/1957 | Johnson ............................. 82/2 D |
| 3,079,731 | 3/1963 | Rawstron et al. .................. 82/19 X |
| 3,153,359 | 10/1964 | Foster et al. ....................... 82/14 |
| 3,212,375 | 10/1965 | Suizu ............................... 82/47 X |
| 3,511,121 | 5/1970 | Meyer et al. ....................... 82/19 |
| 3,589,220 | 6/1971 | Saxon ............................... 82/96 |

Primary Examiner—Harrison L. Hinson
Attorney, Agent, or Firm—Seed, Berry, Vernon & Baynham

[57] ABSTRACT

Method and apparatus for shaping on the end of one right circular cylinder, a compound curvature corresponding to the compound curvature of intersection between the one right circular cylinder and second larger right circular cylinder.

12 Claims, 12 Drawing Figures

① $d = r - \frac{1}{2}\sqrt{4r^2 - c^2}$

② $c/2 = \sin\frac{\alpha}{2} \times r$

③ $\alpha = \dfrac{57.296\ell}{r}$

METHOD AND APPARATUS FOR PRODUCING COMPOUND CURVES CORRESPONDING TO THE INTERSECTION BETWEEN TWO CYLINDERS

BACKGROUND OF THE INVENTION

1. Field of the Invention

This invention pertains to controls for cutting or shaping tools, and more particularly, to the control for a vertical boring milling-type apparatus.

2. Description of the Prior Art

One of the most difficult curvatures to create on large objects is the compound curvature of intersection between two right circular cylinders. That is, the curvature, generally on the end of a small cylinder, formed by aligning the axis of the smaller cylinder at right angles to the axis of the larger cylinder and abutting the full end surface of the smaller cylinder against the larger side surface of the larger cylinder. In smaller cylinders where it was necessary to provide this exact abutting relationship between the cylinders the end surface of the smaller cylinder was rough cut into steps very roughly corresponding to the compound curvature of intersection and then ground to the exact curvature by costly and time consuming hand grinding.

In much larger intersecting cylinder requirements, such as for a forty-six inch diameter nozzle intersecting a seventy-eight inch nuclear reactor cylinder, the two-phase step of cutting and grinding becomes extremely expensive.

SUMMARY OF THE INVENTION

It is an object of this invention to provide a method for producing a compound curvature on a workpiece.

It is another object of this invention to provide a compound curvature on the end surface of a cylinder which corresponds to the curvature of intersection between the end surface of the cylinder and the wall of a larger cylinder whose axis is at right angles to the axis of the smaller cylinder.

It is still another object of this invention to provide a method for controlling the position of a tool of a vertical boring machine to make the tool follow the compound curvature of intersection between two right circular cylinders.

Basically, these objects are obtained by deflecting a template of a type which produces an undulating curve corresponding proportionately to the peaks and valleys of the compound curve of intersection between the two cylinders. This deflection is sensed and produces a corresponding movement of a tool relative to the surface of the smaller cylinder along a circular plane concentric to the axis of the smaller cylinder. Next the deflection is sensed at a second point along the template to produce a second circular plane of cutting corresponding again to the peaks and valleys of the curvature of intersection between the two cylinders. These steps are repeated gradually increasing the amount of deflection until the final curvature cut on the end of the smaller cylinder corresponds exactly with the peaks and valleys of the compound curvature of intersection between the two cylinders. In the preferred embodiment the template is a cantilevered beam of uniformly diminishing cross section so that the curvature of deflection of the beam will always be an arc of a circle whose radius will vary depending upon the extent of the deflection of the outer end of the beam.

It is another object of this invention to provide an apparatus for cutting the compound curvature of intersection between two circular cylinders whose longitudinal axes intersect one another at right angles.

Another object of this invention is to provide a control for the cutting tool of a vertical boring machine which control will cause the cutting tool to produce the compound curvature of intersection between the two intersecting cylinders.

Basically these objects are obtained by providing means for rotating the smaller cylinder and moving a cutting tool in a line parallel to the axis of the smaller cylinder toward and away from the exposed end of the cylinder. The cutting tool position is controlled by a sensor which moves along a flexible template in the form of a cantilevered beam having a uniformly diminishing cross section. Means are provided for deflecting the beam an amount corresponding to the desired curvature in a plane corresponding to the circular line cut by the cutting tool. Means are provided for shifting the sensor along the template to vary the depth of cut to cut a series of circular planes producing a second compound curvature at an angle to the curvature in the circular planes. Finally, means are provided for increasing the depth of cut to produce successively deeper cuts with the cutting tool until the final compound curvature corresponding to the compound curvature of intersection between the smaller and larger cylinders is obtained on the end surface of the smaller cylinder.

The flexible template is preferably in the form of a cantilevered beam of uniformly diminishing cross section. This template always forms a circular arc, that is, the radius of a circle, when deflected within reasonable limits. Consequently, the identical radius of the circumference (or any other circular plane) of the side wall of the larger cylinder can be duplicated in the arc formed by the flexible cantilevered beam. Since the compound curvature of intersection between the two cylinders will have two equidistantly spaced peaks and two equidistantly spaced valleys circumferentially spaced around the end of the smaller cylinder, the amount of deflection can be controlled in timed relation to the rotation of the smaller cylinder so that the beam will lie in a straight line (undeflected) at the point where a valley occurs and will reach full deflection or the radius of the side wall (or other circular plane) of the larger cylinder where the peaks occur. It is thus possible to produce essentially any compound curvature of intersection between cylinders of various sizes merely by controlling the extent of deflection of the beam. In the preferred embodiment beams of various lengths are provided to limit the amount of deflection necessary, however, theoretically a single beam can be employed for all cylinders within a reasonable range of sizes.

The cutting tool can be adjusted to make a cut fine enough on the last pass to essentially eliminate the need for extensive grinding of the surface to achieve a smooth abutting surface. This technique, obviously, greatly simplifies and reduces the procedure for cutting large compound curves.

DETAILED DESCRIPTION OF THE PREFERRED EMBODIMENTS

Figure 1:
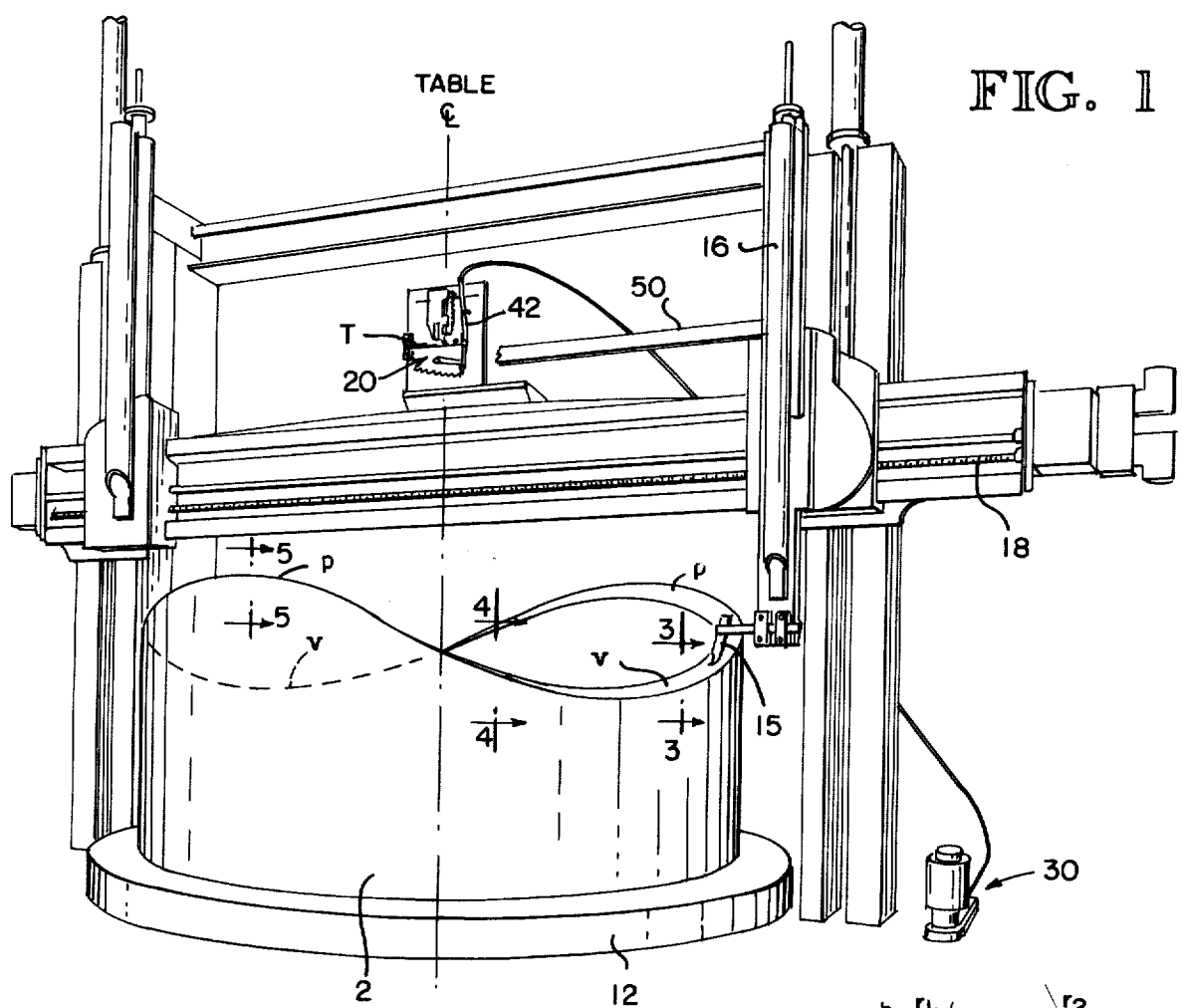
FIG. 1 is a perspective view of a typical cutting apparatus having a cutting tool control embodying the principles of the invention.
Figure 2:
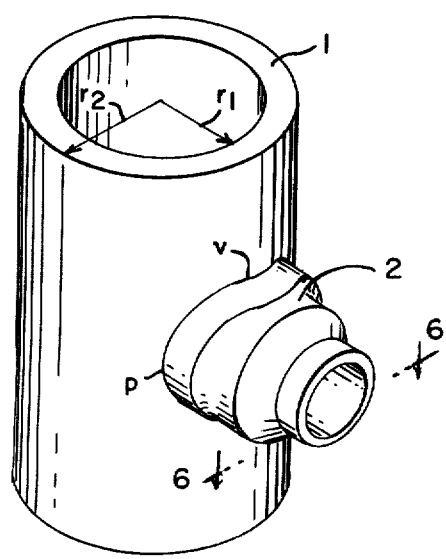
FIG. 2 is an isometric of two right circular cylinders intersecting along their longitudinal axes illustrating the compound curvature of intersection obtained following the principles of the invention.
Figure 3:
FIG. 3 is a fragmentary section taken along the line 3—3 of FIG. 1 illustrating a valley.
Figure 4:
FIG. 4 is a fragmentary section taken along the line 4—4 of FIG. 1 illustrating the cross sectional shape of the curve half way between a peak and a valley.
Figure 5:
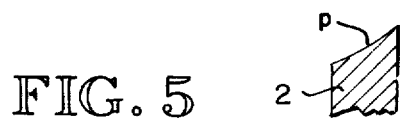
FIG. 5 is a fragmentary section taken along the line 5—5 of FIG. 1 illustrating the curvature at a peak, which curvature is identical to the radius of the outer side wall of the larger cylinder.

As best shown in FIG. 1, the principles of the invention are used in a preferred application for cutting the end surface of a small cylinder 2, for example, 58 inches OD to have the compound curvature of intersection occuring when the smaller cylinder is placed in intersection with its axis at right angles to the axis of a larger cylinder 1 as illustrated in FIG. 2. Visualizing this compound curvature of intersection, it is apparent that at two points along the length of the larger cylinder the end surface of the smaller cylinder will be a straight line. These lines are indicated as valleys v for purposes of description. It is also apparent that at two circumferentially spaced aligned points on the larger cylinder the end surface of the smaller cylinder must conform exactly to the circumferential surface or outer radius of the larger cylinder. These lines or curves are indicated as peaks p. It is also apparent that there is a uniform transition between the straight line valleys and the maximum curve peaks occuring at intermediate points between the valleys and peaks. FIGS. 3, 4, and 5 illustrate, for example, the typical cross section of the end surface of the smaller cylinder 2 at the valleys, at a central intermediate point, and at the peaks.

In order to obtain this compound curvature on the end surface of the smaller cylinder, it is necessary that the shaping or cutting tool and the smaller cylinder move circumferentially relative to one another. Preferably this is obtained by mounting the cylinder on a conventional rotary boring or milling table 12 which is rotated by a motor and gear transmission 14. It is also necessary, of course, to move the cutting tool 15 vertically or toward and away from the exposed end surface of the smaller cylinder. This is accomplished by a conventional hydraulic cylinder or ram 16. Furthermore it is also necessary that the cutting tool be moved toward and away from the center of the cylinder or along a straight radius line. This is accomplished by a conventional ball and screw drive 18. The vertical position of the cutting tool 15 via the cylinder 16 is controlled by a conventional probe or detecting means 20. As is well known in the art, this probe is connected via the cylinder to the tool, follows a template, and through the cylinder 16 provides a position of the cutting tool which corresponds to the position of the probe on the template. As thus far described, the milling table and control for the cutting tool are generally conventional, a suitable control being available from the Tracer Control Company, Hazel Park, Mich., U.S.A.

Figure 7:
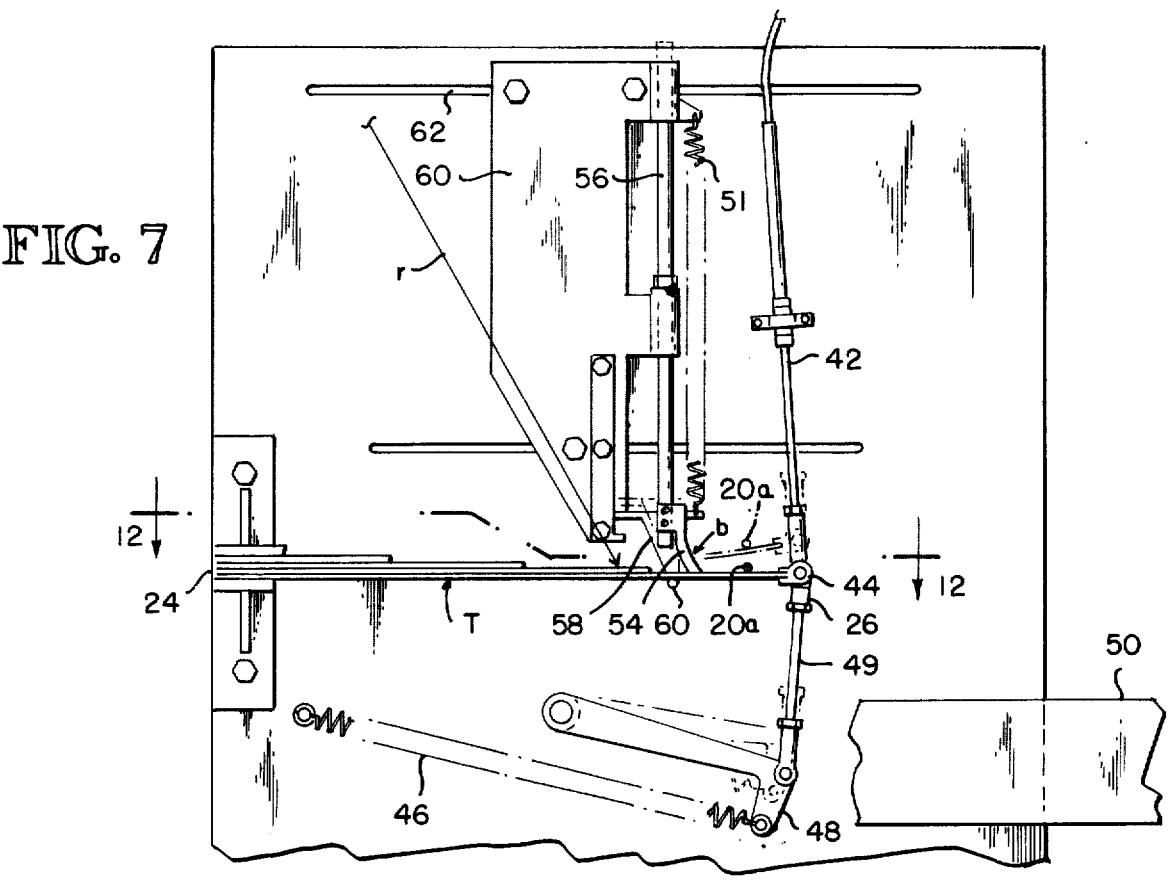
FIG. 7 is a fragmentary front elevation of the control embodying the principles of the invention.
Figure 8:
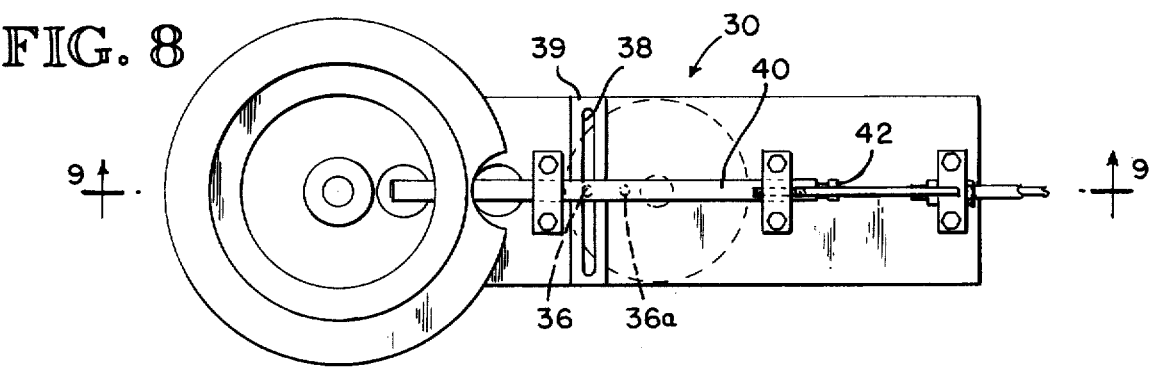
FIG. 8 is plan of the timing apparatus for the control which correlates the rotation of the workpiece supporting table with deflection of the template.
Figure 12:
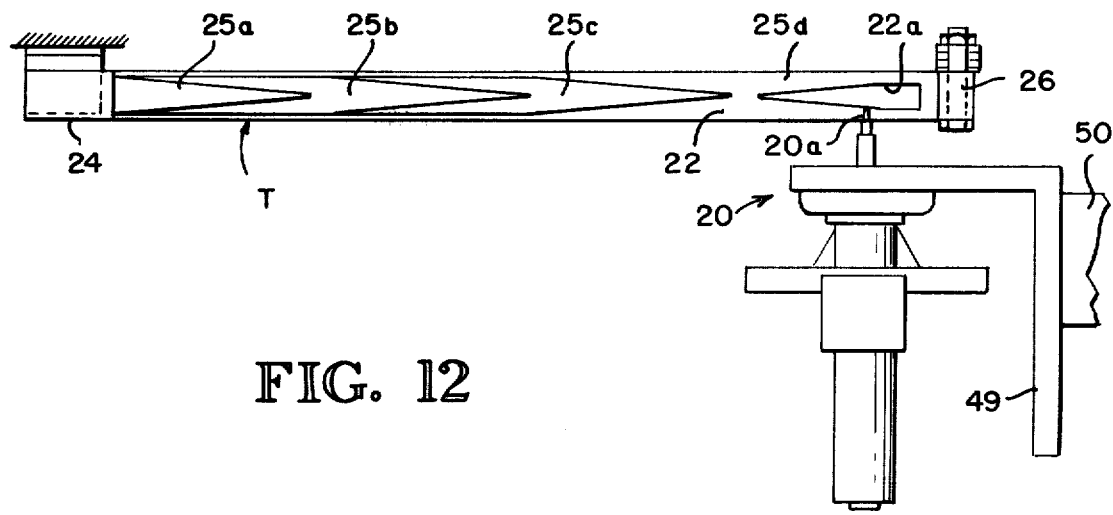
FIG. 12 is a fragmentary plan view of a preferred beam template and a position sensory probe.

It is a unique feature of this invention that a template T is provided which can be deflected in a manner to exactly correspond to the compound curve of intersection of the two circular cylinders. An important characteristic of the template is that its top surface 22 (FIG. 12), in the preferred embodiment, always forms an arc of a circle when deflected. This occurs since the template is theoretically a cantilevered beam fixed at one end 24 which corresponds to the center or longitudinal axis of the larger cylinder 1 and has a uniformly diminishing cross section terminating in a movable end 26. It is expensive and unnecessary to have a perfectly uniformly diminishing cross section, and in the preferred embodiment the ideal cantilevered beam is approximated by a plurality of flexible leaf springs 25a, 25b, 25c, 25d of successively increasing lengths starting from the top leaf spring to the lower most leaf spring so that the effect of the layers as shown in FIGS. 7 and 12 is to uniformly diminish the cross section of the beam. The bottom leaf has an exposed edge on the upper surface 22 along the length of the beam on which the probe 20 rests. The cross section of the lowest leaf 25d is diminished uniformly in the preferred embodiment by a uniformly increasing cut-out 22a.

The basis for establishing the relationship of the beam to the circular shape of a cylinder upon deflection can be derived from the formula $r = EI/M$ where $r$ is the radius of curvature desired, $E$ is the modulus of elasticity of the leaf spring material (Youngs modulus), $I$ is the moment of inertia of the beam, $M$ is the product of the force ($f$) applied times the distance ($l$) the force is applied from the fixed end of the beam. Thus to have a constant radius $r$ regardless of the change in moment $M$ ($f \times l$), $I$ must decrease directly as $M$ increases. Or if the moment arm $l$ is held constant, then $I$ must diminish linearly as $f$ increases linearly.

Figure 6:
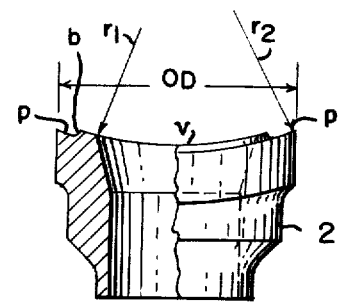
FIG. 6 is a fragmentary section taken along the line 6—6 of FIG. 2 illustrating the plane of intersection of a typical nozzle connection to a reactor cylinder.
Figure 10:
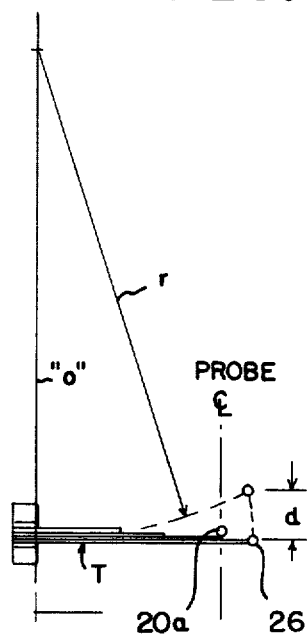
FIG. 10 is a graphic illustration of a typical template deflection.
Figure 11:
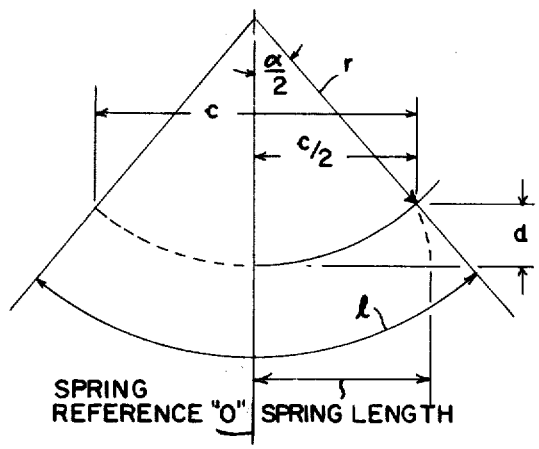
FIG. 11 is a graphic illustration of a typical template deflection and illustrating the formulas to determine the necessary amount of deflection of the template.

For a typical example, assume the outer diameter $OD_2$ of the nozzle is 58⅜ inches as shown in FIG. 6. Assume also that the radius $r_2$ of the cylindrical outer surface of the larger cylinder is 78.6875 inches. The amount of desired deflection $d$ on the flexible template at its outer end is shown in FIG. 11 and equals $r - \frac{1}{2} \times$ the square root of $(4r^2 - c^2)$. A second formula is $c/2 = \sin \text{alpha}/2 \times r$, and a third formula is $\text{alpha} = (57.296 \times l)/r$. Using these formulas for the illustration given with $r = r_2 = 78.6875$ the template spring displacement is 6.517 inches. This means that with the probe at the end 26 then when the cutting tool goes from a valley in which the template is in its straight line position, increasing deflection of the template with corresponding rotational movement between the tool and the nozzle will continue until the tool reaches a peak on the nozzle surface with the template reaching a deflection at its outer end at 26 of 6.517 inches. Subsequent repositioning of the probe toward the fixed end of the template, as shown in FIG. 10, will provide corresponding peaks and valleys along circular planes radially inward from the circumference of the smaller cylinder 2.

Figure 9:
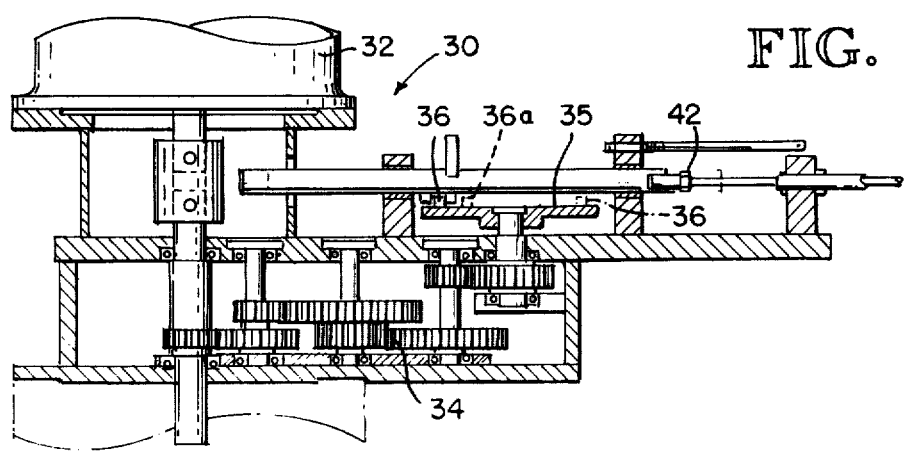
FIG. 9 is a vertical section taken along the line 9—9 of FIG. 8.

In the preferred embodiment the deflection of the template is obtained in synchronism with rotational movement of the table 12 by a deflecting drive 30. The deflecting drive 30 includes a drive motor 32 that powers the table rotating means 14 directly and through a gear reduction transmission 34 drives a cam plate 35 having a pin or cam 36 secured thereto. As is readily apparent, rotational movement of the pin about the axis of the cam plate will be in timed relationship to rotational movement of the rotary table 12 with the preferred drive transmission providing a 2 to 1 speed increase. That is, the cam plate 35 will make two rotations for every single rotation of the rotary table 12. The distance between the pin 36 in its solid line position in FIG. 9 and its position through 180° of rotation, along the diameter, is equal to $d$ or the maximum desired deflection of the end of the flexible template T. In actual use there will be various positions in which the pin 36 can be placed in the cam plate such as shown in phantom lines 36a. Consequently the pin can be moved radially inwardly along the cam wheel to reduce the amount of deflection or can be moved radially outwardly along the wheel to increase the amount of deflection. Conversely the amount of deflection can be held constant and the length of the template T increased with the deflection still occuring at its outer tip. In the latter example the same amount of deflection $d$ will provide a smaller radius of curvature upon maximum deflection than for a shorter beam.

In order to translate this rotary motion of the cam wheel into oscillating deflective movement of the tip of the template T, the pin 36 is trapped in a slot 38 of a yoke 39. The yoke 39 is rigidly secured to a sliding bar 40 which in turn is secured to a bowden cable drive 42. The opposite end of the bowden cable drive 42 is pivotally connected to a clamp 44 which can be bolted or otherwise attached to the end of the template T as shown in FIG. 7. In order to neutralize the force of the spring acting on the bowden cable as the template is deflected, a spring 46 is pivotally connected to a bell crank 48 which in turn is pivotally connected to a link 49 secured to the clamp 44. As is best shown in FIG. 7, upward movement of the bell crank 48 from its solid line position, corresponding to a straight line position of the template T, stretches the spring 46 an amount corresponding to the spring force in the flexible template T which would otherwise be pulling on the bowden cable 42. The pulling force, however, translated through the link 29 is actually reduced as the clamp 26 rises since the lever arm through which the spring 46 acts becomes reduced as the bell crank moves upwardly. That is, the downwardly acting force on the end of the bowden cable 42 through the combined spring force 46 and bell crank movement 48 is at a maximum in the solid line position when the template is in a straight line position as shown. As the bowden cable begins to deflect the template T, the reaction force in the template tending to pull against the end of the bowden cable increases but simultaneously the force applied by the spring 46 decreases a corresponding amount such that the bowden cable 42 feels substantially a constant force on its end. This provision for providing a constant force eliminates the possibility of error which could arise from the elasticity of the bowden cable. Since the bowden cable, in the preferred embodiment, must be of a length sufficient to reach from the floor of the rotary table to the location of the template, perhaps 10 to 20 feet, it can be seen that it is desirable to eliminate changes in the length on the cable due to a change in the pulling force acting on the cable. It is, of course, readily understood that various other types of mechanical or electrical drives can be provided to deflect the template in timed relation to the rotary table but the embodiment illustrated is preferred for its low cost and high accuracy.

As best shown also in FIGS. 7 and 12 the probe 20 for sensing the position of the template is attached to an adjusting bracket 49 fixed to the tool carrying ram 16 by a bar 50. The probe is adjustably mounted for locating its position in both the horizontal and vertical directions. The probe has a pin or tip 20a whose surface abuts the surface 22 of the template T.

To best understand the operation of the control, attention is directed to FIG. 6 showing typical peaks p along the surface of the nozzle 2. The first circumferential cut made by the cutting tool will be at the outer end of the annular surface of the nozzle as viewed in FIG. 6. After a complete cut is made around the circumference of the nozzle, the cutting tool is shifted radially inwardly and downwardly as viewed in FIG. 6. In order to establish this point of the curve on the nozzle, the probe 20 is shifted with the ram 16 to the left along the template so that the probe senses a template deflection proportional to the desired cutting height of the tool. Once a full series of cuts are made across the end of the surface defined by radius $r_2$, the operation is repeated starting again at the outer circumference but with the tool set lower. This repetition is continued taking a series of increasingly greater depth cuts until the finished compound curvature is obtained.

In some applications such as in the nozzle shown in FIG. 6, there is a transition curve $b$ to blend into the radius of curvature $r_1$, for example. As best shown in FIG. 7 an accessory template 54 is added to ride with the flexible template T so that the probe tip 20a can move off the surface 22 of the template T and onto the radius of curvature $b$ of the accessory template 54. The accessory template 54 is mounted on a slidable bar 56 which is spring biased upwardly by a spring 57. The bar is connected to a plate 58 which has a cam roller 60 fixed thereto and which is pressed upwardly in contact with the underside of the template T to position the accessory template 54 in firm engagement with the flexible template. The slidable rod 56 is mounted on a bracket 60 that it is adjustably secured in slots 62 on the stationary mounting plate. Initial positioning of the accessory template 54 along the length of the flexible template T is thus initially established to coincide with the point of initiation of the upward curve $b$ on the radius of curvature $r_2$ of the part being cut. When the probe 20a thus reaches the location on the template to begin the curve $b$ the cutting tool begins making the curvature $b$ on the nozzle.

While the preferred embodiment of the invention has been illustrated and described, it would be understood that variations will be apparent to one skilled in the art without departing from the principles described herein. Accordingly, the invention is not to be limited to the specific embodiment illustrated.

The embodiments of the invention in which a particular property or privilege is claimed are defined as follows:

1. The method of automatically forming a compound curvature corresponding to the compound curvature of intersection between intersecting smaller and larger cylinders with corresponding peaks and valleys on a cylindrical workpiece end surface using a tool guided by a control probe riding on a template, comprising:

moving the tool and workpiece relatively toward and away from one another in timed relation with movement of the tool and workpiece relatively circumferentially of one another in a series of circular radially spaced first planes, simultaneously varying the extent of relative tool and workpiece movement in each circular plane to correspond to a second circular plane at an angle to said first circular planes and corresponding at two diametrically spaced points to the radius of curvature of the larger cylinder, and repeating said movements through a series of deeper cuts to form the final compound curvature on the end surface of the smaller cylinder.

2. The method of claim 1, said template including a flexible cantilevered beam of uniformly diminishing cross section, said step of varying the extent of relative tool and workpiece movement toward and away from one another including flexing the beam in timed relation to the relative circumferential movement of the tool and workpiece, sensing the continuously deflected position of a series of points along the beam correspondng to the desired circular first planes on the workpiece, and moving the cutting tool in direct corresponding relationship to the sensed position of the points on the beam.

3. The method of claim 2, said step of moving the tool and workpiece relatively circumferentially including rotating the workpiece about its longitudinal axis at a predetermined speed.

4. The method of claim 2, said step of flexing the beam including moving the outer tip of the beam through its maximum desired deflection twice during each revolution of the workpiece.

5. The method of claim 2, further including adding a rigid supplemental template to said beam for movement therewith and sensing points along the supplemental template to deviate from the beam curvature for producing a curvature at still an additional angle from said compound curvature of intersection.

6. The method of automatically cutting a compound curvature resulting from the intersection of two right angle cylinders, on a rotating workpiece, comprising rotating the workpiece at a predetermined speed, deflecting through a predetermined distance in timed relation to said predetermined speed a cantilevered beam template of a cross section uniformly diminishing from a thick fixed end to a free thinner end to produce a dynamic curved plane varying from a straight line to a curve corresponding to the curvature of the larger cylinder, sensing movement of said beam at a point along said beam, controlling the depth position of a tool in response to said sensed movement for cutting a circular line on said rotating workpiece which conforms to the deflection of said beam, after rotating the workpiece through one revolution sensing a second position along the length of the beam which conforms to a radially spaced circular plane on the end of the smaller cylinder and indicates a change in depth of cut corresponding to the depth distance along the axis of the smaller cylinder while deflecting the beam in timed relation with rotation of the workpiece, and controlling the depth position of the tool along said second circular plane in conformance with said second position sensed, whereby the movement sensed is an undulating plane surface of revolution corresponding to the plane of intersection between two right angle cylinders, and repeating the foregoing steps while increasing the depth of cut to gradually cut deeper curves until the exact curvature of intersection of the cylinders is obtained.

7. A control device for obtaining compound curves having peaks and valleys corresponding to the compound curvature of intersection between two intersecting first and second cylinders on the exposed end surface of the second cylinder while being rotated in a vertical boring machine having a rotating table for supporting the second cylinder, a cutting tool, a powered actuator for positioning the tool, a probe for guiding the powered actuator, and a deflectable template for guiding the probe, the improvement comprising:

said template comprising a cantilevered beam uniformly diminishing from its fixed end, means for continuously deflecting the template to produce a deviation along the template corresponding to a maximum variation of curvature of the exposed surface of the second cylinder which corresponds to the radius of curvature of the larger cylinder along a series of radially spaced circular planes on the second cylinder, means for continuously correlating the amount of deflection of the template with movement of the rotary table, means for detecting the deflection of the template, means responsive to said detecting means for moving the tool toward and away from the second cylinder exposed surface an amount corresponding to the deflection of said template, whereby peaks and valleys are cut into said second cylinder exposed surface, means for moving the detecting means along the template to measure the deflection at a second point on the template corresponding to a second circular plane radially spaced from said first circular plane, and means for shifting the tool into said second circular plane in response to movement of said detecting means along the template whereby a new set of peaks and valleys are cut in the second cylinder exposed surface of a magnitude corresponding to said template deflections for producing a compound curvature on the exposed surface of the second cylinder which matches the curvature of the first cylinder intersecting at right angles with said second cylinder.

8. The device of claim 7, said means for deflecting the template including a clamp secured to the free end of the template, a drive mechanism linked to the rotating table for movement in timed relation to the rotation of the table, and flexible cable means coupling said clamp and said drive mechanism.

9. The device of claim 8, said drive mechanism including a cam pin moved through a circle twice for each revolution of the rotary table, and a yoke reciprocably following said cam pin and coupled to said flexible cable means for converting the circular movement of said drive pin to oscillating movement of the template free end.

10. The device of claim 7, said template including a plurality of overlapping leaf springs each having an end portion of uniformly diminishing cross section and wherein the smaller end of each successive spring terminates approximately where the uniformly diminishing end portion of the next spring begins.

11. The device of claim 7, including a rigid supplemental template fixed to said flexible beam for movement therewith to produce still another curvature at an angle to said compound curvature.

12. The device of claim 8, said means for deflecting the template including variable spring force linkage means for increasing the pulling force on said flexible cable means at said clamp as the beam becomes less deflected and at a rate approximately equal to the spring force acting on the cable by the template as it is deflected for maintaining a generally constant pull on the flexible cable means.

* * * * *